United States Patent [19]

Takahashi

[11] Patent Number: 5,721,941
[45] Date of Patent: Feb. 24, 1998

[54] CHARACTER PROCESSING APPARATUS AND METHOD INVOLVING A TAB

[75] Inventor: Tsutomu Takahashi, Kawasaki, Japan

[73] Assignee: Canon Kabushiki Kaisha, Tokyo, Japan

[21] Appl. No.: 743,142

[22] Filed: Aug. 9, 1991

[30]  Foreign Application Priority Data

Aug. 14, 1990 [JP] Japan ................................ 2-214642

[51] Int. Cl.$^6$ .................................................. G06F 17/25
[52] U.S. Cl. ........................................................ 395/51.79
[58] Field of Search ........................... 395/148, 144–147, 395/149, 155, 161, 779–786

[56]  References Cited

U.S. PATENT DOCUMENTS

| | | | |
|---|---|---|---|
| 4,808,016 | 2/1989 | Takahashi | 400/17 |
| 4,841,478 | 6/1989 | Takahashi | 395/780 |
| 4,863,298 | 9/1989 | Takahashi | 400/279 |
| 5,299,303 | 3/1994 | Fukunaga | 395/780 |

FOREIGN PATENT DOCUMENTS 61-204734  9/1986  Japan .

OTHER PUBLICATIONS

Borland, Quattro Pro User's Guide, 1989, pp. 471–474, 1990.
Borland, Quattro User's Guide, 1987, pp. 40–46, 294–297.
Patent Abstracts of Japan, vol. 7, No. 82, an English Abstract published Apr. 6, 1983 of Japanese Patent No. 58–012060.
Patent Abstracts of Japan, vol. 11, No. 35, an English Abstract, published Feb. 3, 1987, of Japanese Patent No. 61-204,734.
Microsoft Works Users Guide, V. 2.0 for Packard Bell Computers Copyright 1987, 1988, 1989.
Acerson, Word Perfect: The Complete Reference, 1988 pp. 308–313, 841–853, 932–939.

*Primary Examiner*—Anton W. Fetting
*Attorney, Agent, or Firm*—Fitzpatrick, Cella, Harper & Scinto

[57]  ABSTRACT

A character processing method of a word processor or the like including a general tab to align a character train data group and a decimal tab to align a numeric value data group are stored in a memory. On the basis of an instruction of the sorting of data existing in a desired area which is specified by tabs, the data as an object to be sorted is determined in accordance with the kinds of tabs to specify the desired area. The tab positions are displayed on the display screen. A display style of the tab positions is changed in conjunction with the display of the menu screen which can instruct the data sorting.

6 Claims, 11 Drawing Sheets

| | | |
|---|---|---|
| $\ell_1$ | addr 1 | 5 |
| $\ell_2$ | addr 2 | N-3 |
| $\ell_3$ | addr 3 | 1 |
| $\ell_{N-1}$ | addr N-1 | 2 |
| $\ell_N$ | addr N | 7 |

Memberships → 1990 → 1988 → 1989 →
Kentucky → 75 → 80 → 110 →
California → 200 → 240 → 280 →
Wisconsin → 50 → 10 → 18 →
Nebraska → 128 → 130 → 145 →
Arizona → 80 → 120 → 135 →

1ST COL.  2ND COL.  166  3RD COL.  4TH COL.  5TH COL.  167  161

CHARACTER PROCESSING APPARATUS AND METHOD INVOLVING A TAB

BACKGROUND OF THE INVENTION

1. Field of the Invention

The present invention relates to a document processing apparatus of an electronic typewriter, a word processor, or the like.

2. Related Background Art

Hitherto, as such a kind of document processing apparatus, there has been known an apparatus having what is called a sorting function to sort a certain group of data in accordance with a predetermined or designated rule. For instance, the sorting function is such that persons' names or place names are sorted in accordance with a dictionary arranging order (alphabetical or the like) or that participants of games or tests are sorted in accordance with the order of scores the participants earned in the games or tests.

Since the document processing apparatus mainly performs the document processing function, numeric values are also handled as numerals or numeral train instead of as inherent numeric value data. That is, in general, numeric values are processed as a train of predetermined codes (for instance, ASCII codes) without a distinction between characters and numeric values and are developed into a memory means or the like. Upon sorting, in the conventional document processing apparatus, a group of data which have been coded and stored in the memory means are sorted on the basis of those codes.

However, although the sorting based on codes is effective when a group of data to be inherently handled as a character train of, for instance, persons' names, place names, or the like are sorted in accordance with the dictionary arranging order, it is remarkably difficult to sort numeric values such as scores which should inherently be handled as numeric value data.

Therefore, a method can be used whereby upon sorting data as numeric value data, some key operations are executed to thereby inform the apparatus of the fact that numerals or a numeral train as objects of processes should be handled as numeric values, and the apparatus side reconstructs the numeric value data from the numerals or the numeral train in response to such a notification, and executes the sorting operation while performing comparing processes with a calculating function.

In such a construction, however, the operation to activate a different sorting process is needed, resulting in deterioration of the operability of the apparatus.

SUMMARY OF THE INVENTION

It is an object of the invention to provide a document processing apparatus which can execute the sorting corresponding to a character train and numeric values at a high speed without causing a deterioration in operability of the apparatus.

Another object of the invention is to provide a document processing apparatus comprising: first tab setting means for setting a tab to align a group of character train data; second tab setting means for setting a tab to align columns of a group of numeric value data; tab kind holding means for holding a kind of tab which has been set by the first or second tab setting means; discriminating means into which either one of those tabs is set and which discriminates the kind of the tab with respect to a group of data in which the sorting based on a predetermined rule has been instructed on the basis of the content of the set tab; first sorting means for executing the sorting according to data codes of the group of data in the case where the tab has been set in the group of data by the first tab setting means as a result of the discrimination; and second sorting means for handling the group of data as a group of numeric value data and for executing the sorting according to the magnitudes of numeric values in the case where the tab has been set in the group of data by the second tab setting means as a result of the discrimination.

Still another object of the invention is to provide a document processing apparatus, in which the kind of set tab is discriminated, and in the case of the tab to align characters, a sorting based on character codes is executed, and in the case of the tab to align numeric values, a sorting is executed by handling a numeral train as numeric value data, so that it is sufficient for an operator to merely designate a data group to be sorted in accordance with a predetermined rule on the basis of the content of the data, and the sorting corresponding to the character train and the numeric values can be executed at a high speed by simple operations.

DETAILED DESCRIPTION OF THE PREFERRED EMBODIMENT

An embodiment of the invention will be described in detail hereinbelow with reference to the drawings.

Figure 1A:
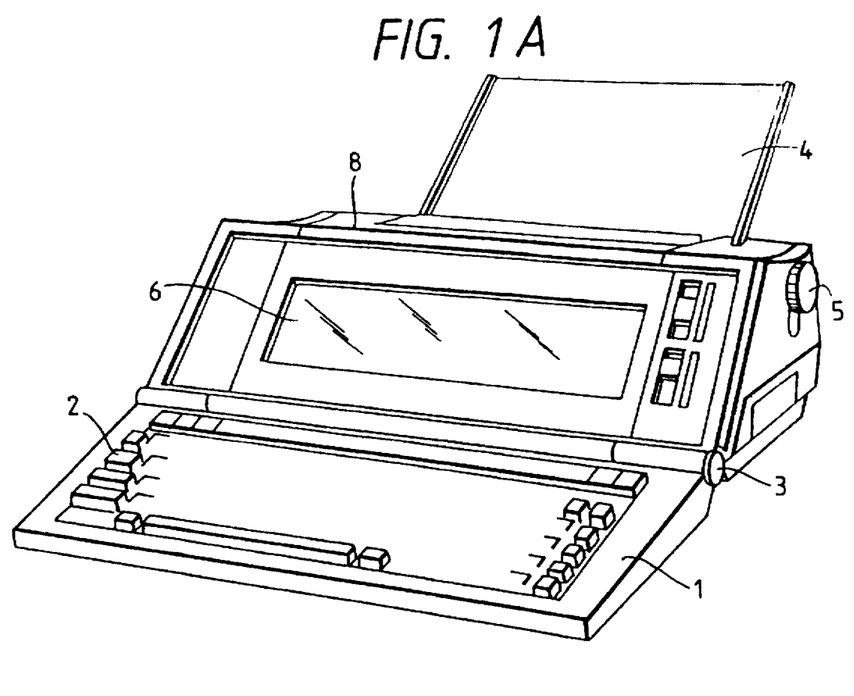
FIGS. 1A and 1B are external perspective views showing states of an electronic typewriter as an apparatus according to an embodiment of the invention when it is used and when it is put away, respectively.
Figure 1B:
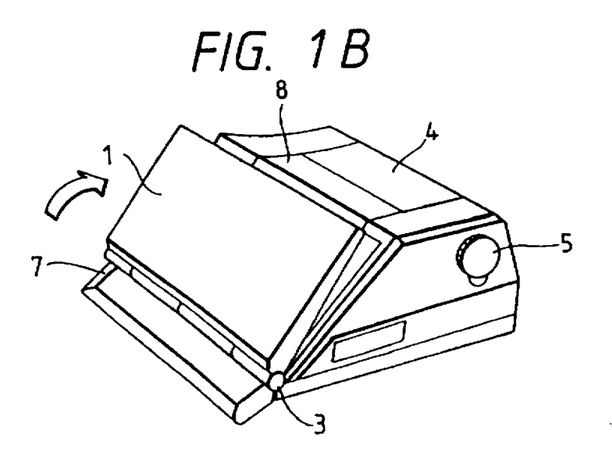

FIGS. 1A and 1B show examples of external constructions of an electronic typewriter as an apparatus to which the invention can be applied.

Reference numeral 1 denotes a keyboard section. A group of keys 2 such as key to input characters, numerals, and the like, control key, and the like are arranged on the keyboard section 1. When the keyboard section 1 is not used, it can be folded up as shown in FIG. 1B by rotating the keyboard section 1 around a hinge 3 as a rotational center. Reference numeral 4 denotes a paper feed tray to feed a sheet-like recording medium to the printer section in the apparatus. When the tray is not used, it is enclosed into the apparatus so as to cover the printer section as shown in FIG. 1B in a manner similar to the keyboard section 1. Reference numeral 5 denotes a feed knob to manually set or discharge the recording medium; reference numeral 6 denotes a display to display an input document or the like; and reference numeral 7 denotes a handle which is used to carry the apparatus according to the embodiment.

Figure 2:
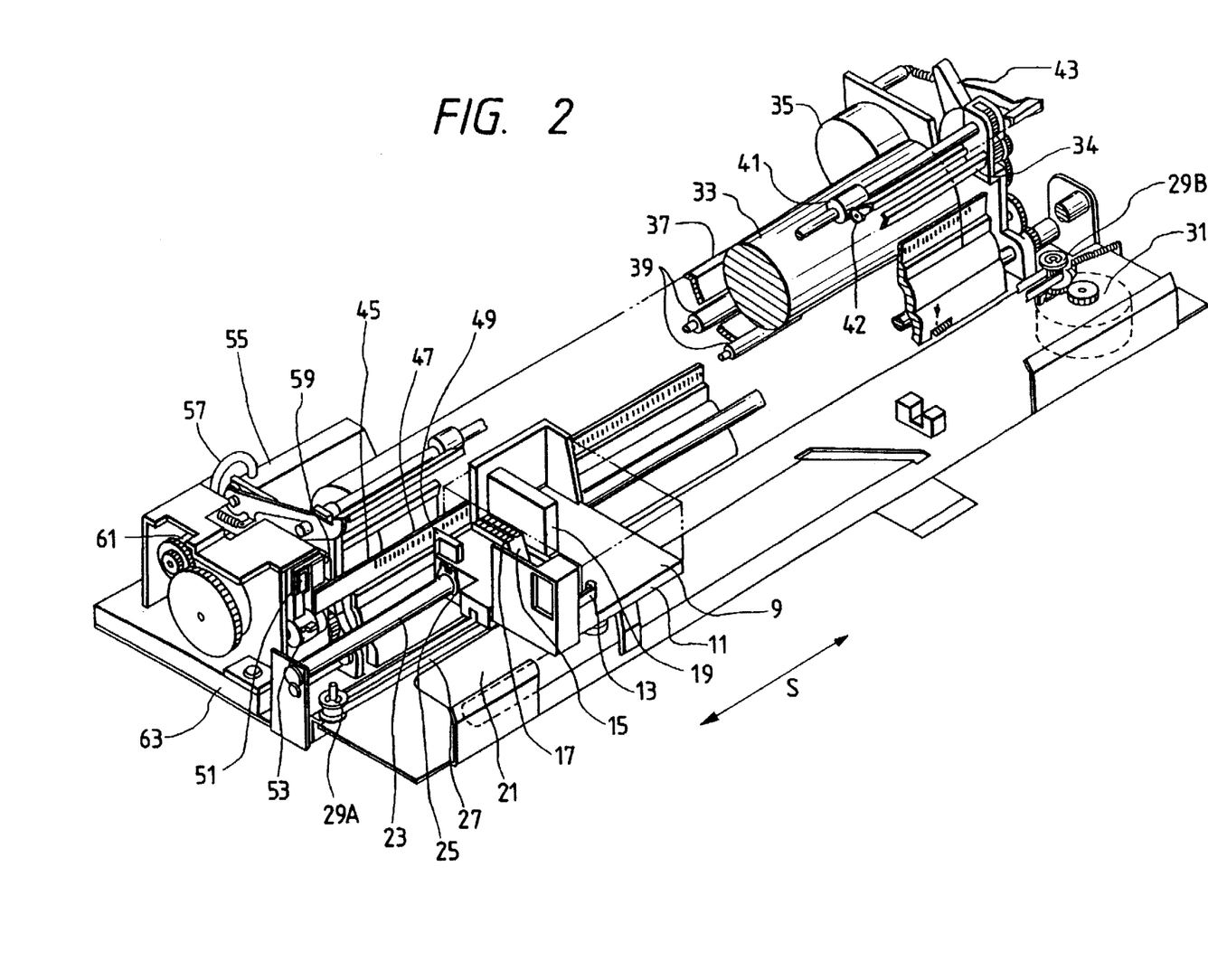
FIG. 2 is a perspective view showing an example of a construction of a printer section which can be used in the apparatus.

FIG. 2 shows a example of a structure of the printer section according to the embodiment.

Reference numeral 9 denotes a head cartridge having an ink jet recording head; reference numeral 11 denotes a carriage on which the head cartridge 9 is mounted and which scans the head cartridge in the directions indicated by arrows S in the diagram; reference numeral 13 denotes a hook to attach the head cartridge 9 to the carriage 11; and reference numeral 15 denotes a lever to operate the hook 13. The lever 15 has a marker 17 for indicating a scale formed on, for instance, a cover (not shown) and for enabling the printing position, setting position, or the like by a recording head of the head cartridge to be read. Reference numeral 19 denotes a supporting plate to support an electric connecting section to the head cartridges 9 and 21 a flexible cable to connect the electric connecting section and a control section of the apparatus main body.

Reference numeral 23 denotes a guide shaft to guide the carriage 11 in the S directions. The guide shaft 23 penetrates a bearing 25 of the carriage 11. Reference numeral 27 denotes a timing belt to which the carriage 11 is fixedly attached and which transfers a motive power to move the carriage 11 in the S directions. The timing belt 27 extends between pulleys 29A and 29B arranged in both side portions of the apparatus. A driving force is transferred from a carriage motor 31 to the pulley 29B through a transfer mechanism such as a gear or the like.

Reference numeral 33 denotes a conveying roller for restricting a recording surface of the recording medium such as a paper or the like (hereinafter, referred to as a recording paper) and for conveying the recording paper upon recording or the like. The conveying roller 33 is driven by a conveying motor 35. Reference numeral 37 denotes a paper pan to lead the recording medium to the recording position from the side of the paper feed tray 4; reference numeral 39 denotes a feed roller which is arranged in a feeding path of the recording medium and is used for pressing the recording medium to the conveying roller 33 and for conveying the recording medium; reference numeral 34 denotes a platen which is arranged so as to face an emitting port forming surface of the head cartridge 9 and is used to restrict the recording surface of the recording medium; reference numeral 41 denotes a paper discharge roller which is arranged on the downstream side with respect to the recording position in the conveying direction of the recording medium and is used to discharge the recording medium toward a paper discharge port (not shown); reference numeral 42 denotes a spur which is provided in correspondence to the paper discharge roller 41 and is used for pressing the roller 41 against the recording medium and for causing a conveying force to act on the recording medium from the roller 41; and reference numeral 43 denotes a release lever to release the pressing operations of the feed roller 39, pressing plate 45, and spur 42 when the recording medium is set or the like.

Reference numeral 45 denotes a pressing plate for suppressing a floating-up state or the like of the recording medium at a location near the recording position and for assuring an adhering state to the conveying roller 33. In the embodiment, the ink jet recording head which records by emitting an ink is used as a recording head. Therefore, the distance between the ink emitting port forming surface of the recording head and the recording surface of the recording medium is relatively very small and such an interval must be severely managed so as to avoid contact between the recording medium and the ink emitting port forming surface. Thus, it is effective to arrange the pressing plate 45. Reference numeral 47 denotes a scale formed on the pressing plate 45 and 49 indicates a marker provided for the carriage 11 in correspondence to the scale 47. The printing position and setting position of the recording head can be also read by the scale and the marker.

Reference numeral 51 denotes a cap made of an elastic material such as a rubber or the like. At a home position, the cap 51 faces the ink emitting port forming surface of the recording head and is supported so as to come into contact with or be removed away from the recording head. The cap 51 is used to protect the recording head in the non-recording mode or to execute an emission recovering process of the recording head. The emission recovering process denotes a process (preemission) such that by driving an energy generating element which is arranged at an internal position in the ink emitting port and is used to emit the ink, the ink is emitted from all of the emitting ports, thereby eliminating causes of a defective emission such as air bubbles, dust, and ink which has became unsuitable for recording because of an increase in viscosity, and the like. The emission recovering process also denotes a process to eliminate the causes of such a defective emission by forcedly draining the ink from the emitting ports independently of the above preemission.

Reference numeral 53 denotes a pump which generates a sucking force to forcedly drain the ink and is used to suck the ink stored in the cap 51 upon execution of the emission recovering process by the forced drain and the emission recovering process by the preemission as mentioned above. Reference numeral 55 denotes a drain ink tank to store the drain ink which has been sucked by the pump 53, and reference numeral 57 indicates a tube to connect the pump 53 with the drain ink tank 55.

Reference numeral 59 denotes a blade to wipe the emitting port forming surface of the recording head. The blade 59 is movably supported at a position where the blade is projected toward the recording head side and executes the wiping operation during the movement of the recording head and a backward position where the blade does not come into engagement with the ink emitting port forming surface. Reference numeral 61 denotes a motor and reference numeral 63 indicates a cam device which receives a motive power from the motor 61 and drives the pump 53 and moves the cap 51 and the blade 59, respectively.

Figure 3:
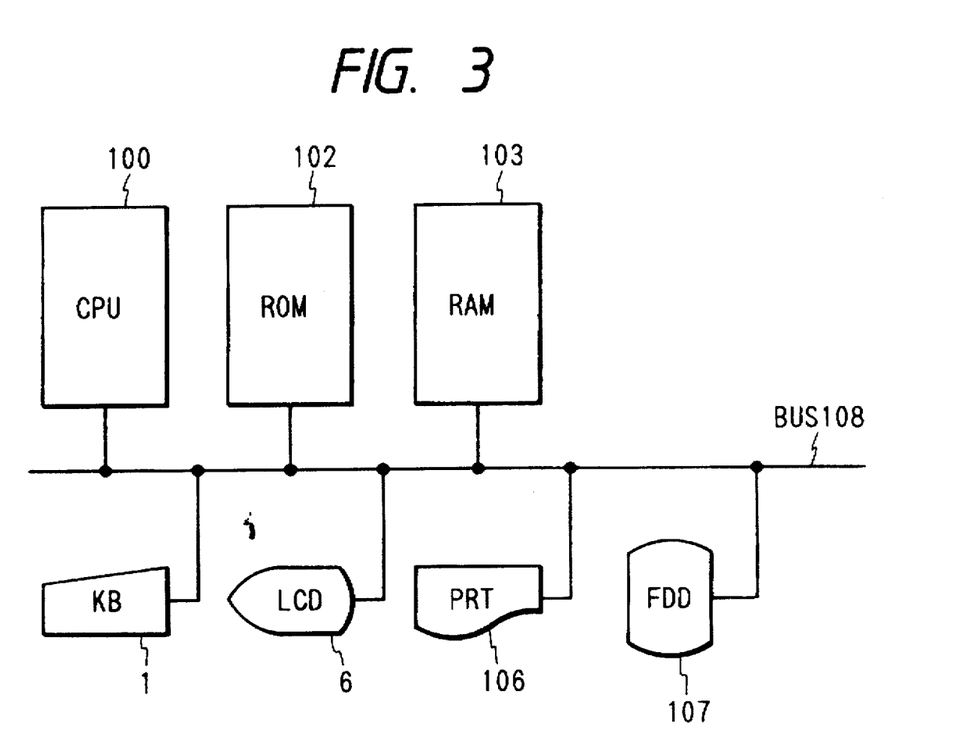
FIG. 3 is a block diagram showing an example of an electrical construction of the apparatus according to the embodiment.

FIG. 3 is a block diagram showing an outline of a document processing apparatus of an electronic typewriter form according to the embodiment. Reference numeral 100 denotes a CPU such as a microcomputer for executing processing procedures or the like in FIGS. 9 to 11, which will be explained hereinlater. Reference numeral 102 denotes a ROM in which programs corresponding to the above processing procedures and other fixed data have been stored; reference numeral 103 denotes a RAM to work and to temporarily store document data; reference numeral 106 denotes a printer section which has already been mentioned in conjunction with FIG. 2; reference numeral 107 denotes a floppy disc device; and reference 108 denotes a bus line to connect the above components 100 to 107 and also to connect the keyboard 1 and display 6 shown in FIG. 1. An address bus to transfer address signals, a control bus to transfer control signals and a data bus to transfer various kinds of data are generally referred to as a bus line.

Figure 4:
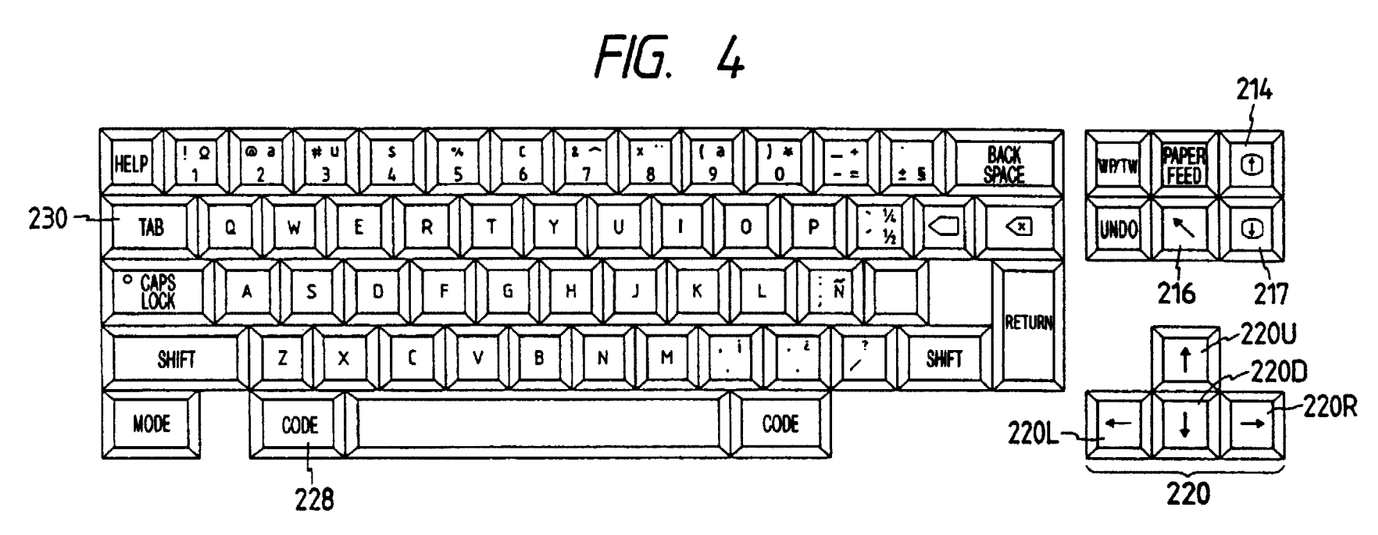
FIG. 4 is a plan view showing an example of a construction of a keyboard section of the above apparatus.

FIG. 4 shows an example of a key arrangement on the keyboard section 1. As shown in the diagram, the keyboard section 1 according to the embodiment has a well-known key arrangement including a group of input keys of characters and numerals, a space key, a back space key, a shift key, a group of control keys, and the like. In the diagram, reference numerals 214 and 217 denote keys which are operated to display a preceding picture plane and a next picture plane; reference numeral 216 denotes a key which is used to move a cursor to the head of a document file during the process and to display the head portion of the document file; and reference numeral 220 denotes a group of cursor keys to move the cursor in the direction of a corresponding arrow.

Reference numeral 228 denotes a key for enabling a predetermined function to be executed by depressing another key (for instance, a numeric value key, a character key, or other setting key) together with the key 228.

Reference numeral 230 denotes a general tab setting key which is used to set a tab position to align a group of data to a right position or a left position. On the other hand, by operating both of the key 230 and another key (for example, a CODE key 228), what is called a decimal tab can be set to align a group of numeric value data at the position of a decimal point.

Figure 5:
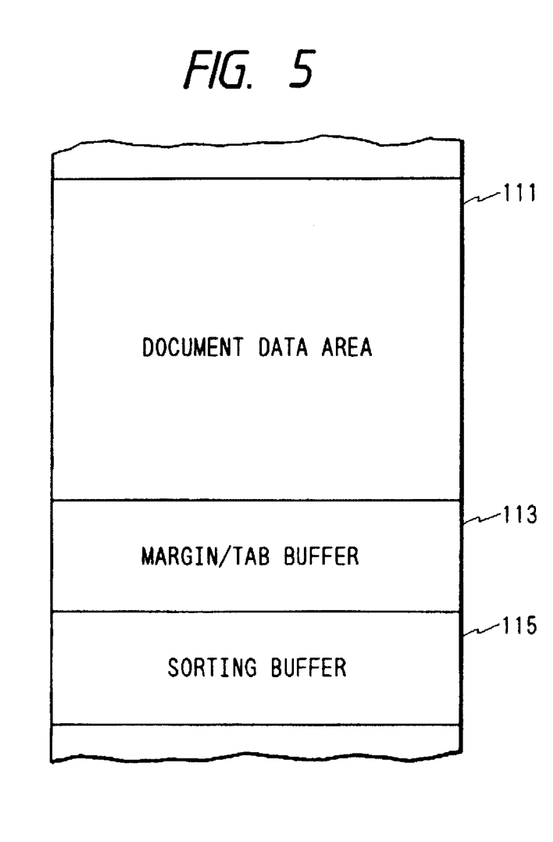
FIG. 5 is an explanatory diagram showing an example of a data arrangement in an RAM in FIG. 3.

FIG. 5 shows an example of a data arrangement in the RAM 103.

Reference numeral 111 denotes a document data area. Document data which is at present being processed, such as a sentence which is at present being inputted, document a which has been read out of a floppy disc, or the like is developed in the document data area 111. Reference numeral 113 denotes a margin/tab buffer to store set data regarding the margins and tabs with respect to a document as an object to be sorted. Reference numeral 115 denotes a sorting buffer which is used for a work upon sorting.

Figure 6:
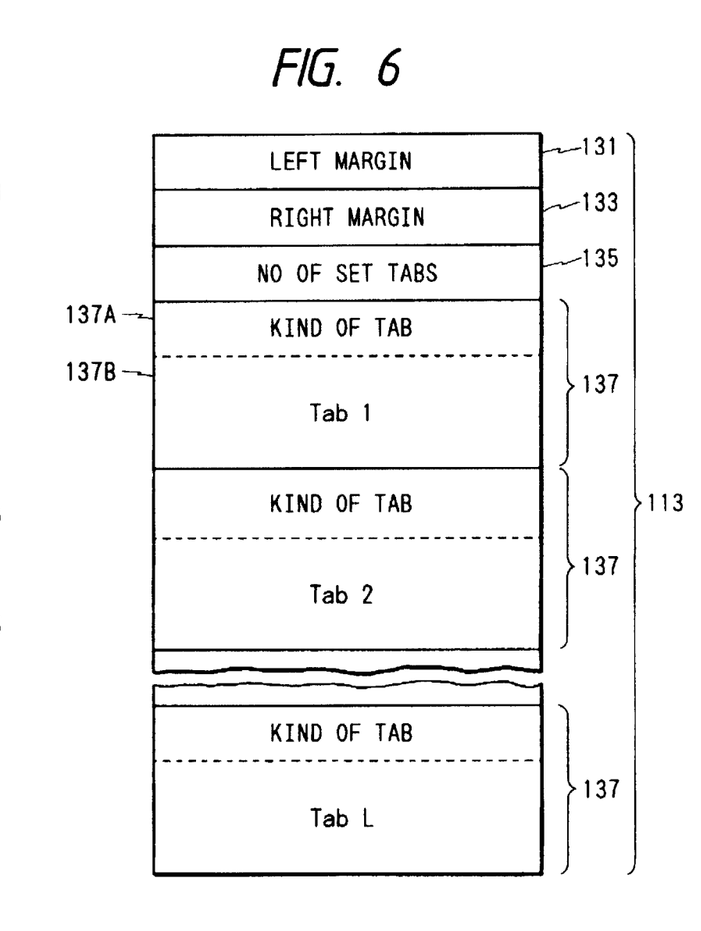
FIGS. 6 and 7 are explanatory diagrams showing examples of constructions of a margin tab buffer and a sorting buffer, respectively.

FIG. 6 shows an example of a structure in the margin/tab buffer 113. Reference numerals 131 and 133 denote storage areas of the left margin position and the right margin position; reference numeral 135 denotes an area to store the number of tabs set in the document; and reference numeral 137 denotes an area to store data of each of the tabs (Tab1 to TabL) which have been set. The storage area 137 comprises: a storage section 137A of data indicative of the kind of tab, that is, data indicating whether the tab is the general tab which is set for data to be handled as a character train or a decimal tab which is set for data to be handled as a numeric value; and a storage section 137B of the position data. In the embodiment, "0" is set in the case of the general tab and "1"is set in the case of the decimal tab.

Figure 7:
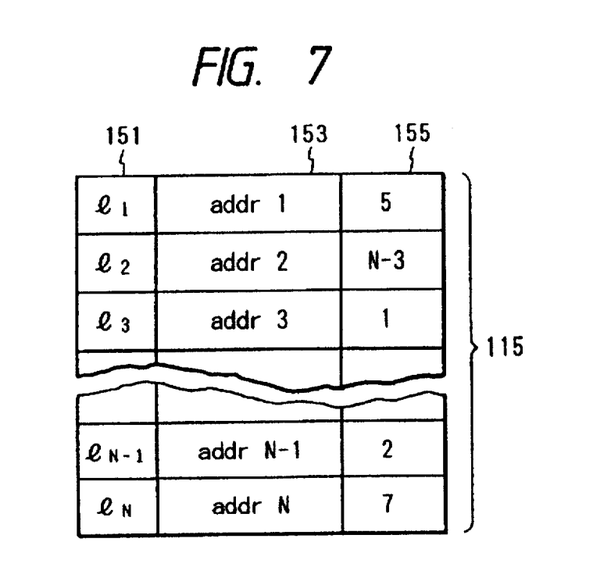

FIG. 7 shows an example of a structure of the sorting buffer 115. The sorting buffer in the embodiment is formed when a sorting process is executed. The sorting buffer 115 includes: a storage section 151 of data indicative of line positions $l_1, l_2, \ldots, l_N$ of a document as an object to be sorted; a storage section 153 to store addresses $addr_1, addr_2, \ldots, addr_N$ of head characters (or numerals) of the lines with respect to a column to be sorted with regard to the contents in the storage section 151; and a storage section 155 to store the order for sorting.

Figure 8:
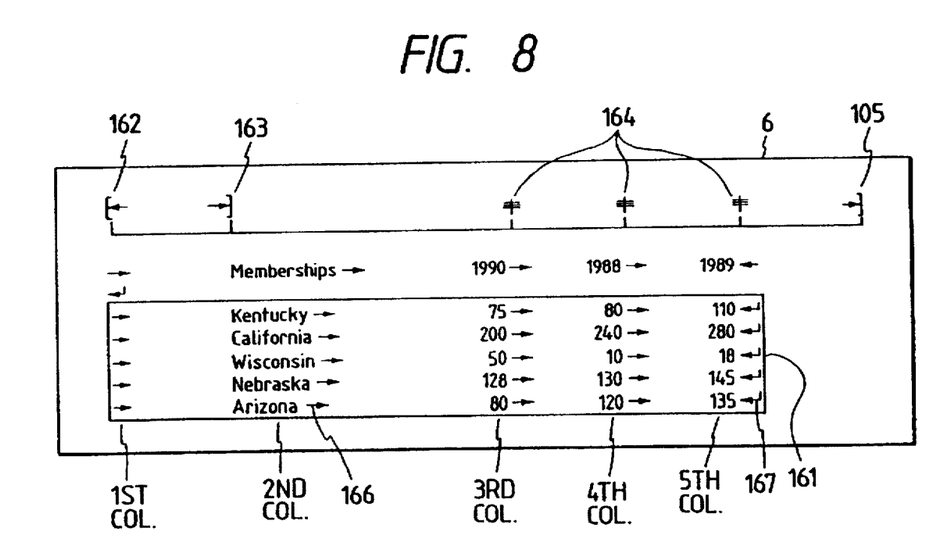
FIG. 8 is an explanatory diagram of an example of a document as an object to be sorted.

FIG. 8 is an explanatory diagram of a document as an object to be sorted. Reference numeral 161 denotes a range designated as an object to be sorted. The line position data of the lines of "Kentucky" to "Arizona" in the diagram is developed in the line position data storage section 151. Reference numerals 162, 163, 164, and 165 denote symbols indicative of the left margin, the general tab, the decimal tab, and the right margin, respectively. A column is separated by a symbol shown by reference numeral 166. Each line is separated by a return symbol 167. The column number is determined by the number of tab commands. Columns are determined in a manner such that the column which is inputted from the left margin is set to the first column because no tab exists before it, the column aligned by the first tab is set to the second column, the column aligned by the second tab is set to the third column, the fourth column and subsequent columns are set in a manner similar to the above.

For instance, in the case of sorting with regard to the content of the second column, the storage addresses of "K", "C", "W", "N", and "A" are developed in the storage section 153 in FIG. 7 and the storage addresses of "7", "2", "5", "1", and "8" are developed in the case of sorting with respect to the third column.

Figure 9:
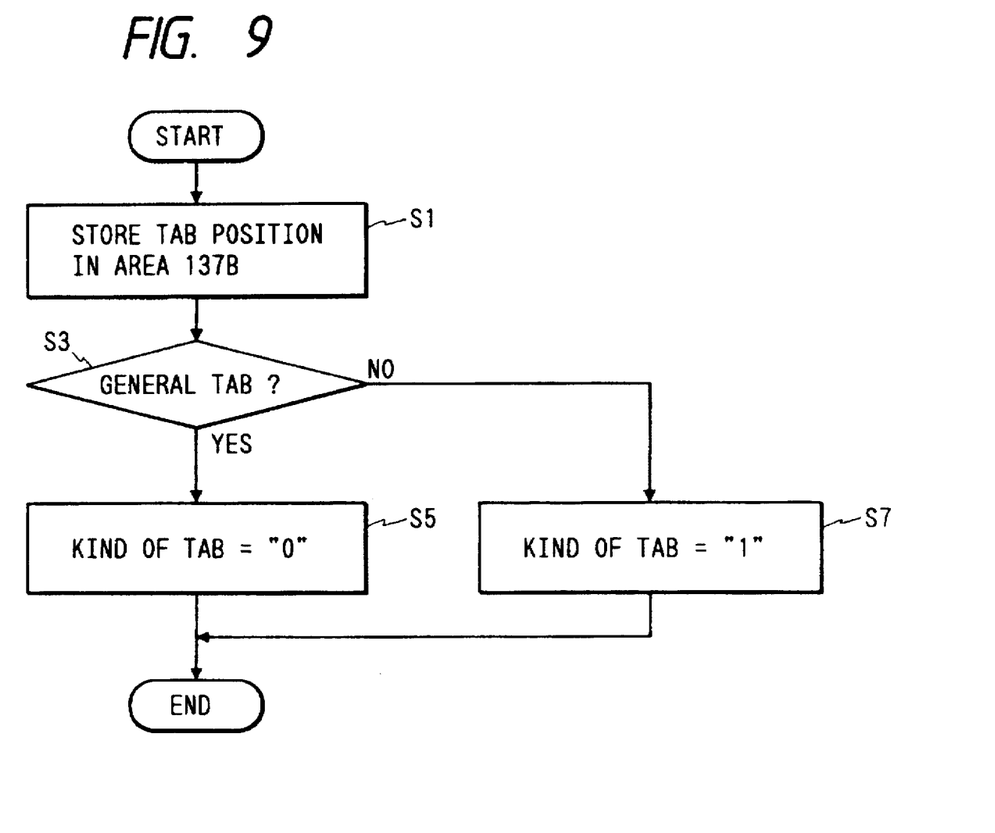
FIG. 9 is a flowchart showing an example of a tab setting processing procedure according to the embodiment.

FIG. 9 shows an example of a processing procedure upon tab setting according to the embodiment. When the operator sets a tab by using the keyboard 2 during the execution of the document editing process while observing the display 6, the tab position is stored into the tab position data storage section 137B in the margin/tab buffer 113 in step S1 and the content (the number of tabs) in the area 135 is updated. A check is now made in step S3 to see if the set tab is the general tab or the decimal tab. "0" is set into the tab kind data storage section 137A in the case of the general tab. "1" is set into the storage section 137A in the case of the decimal tab. The processing routine is finished.

Figure 10:
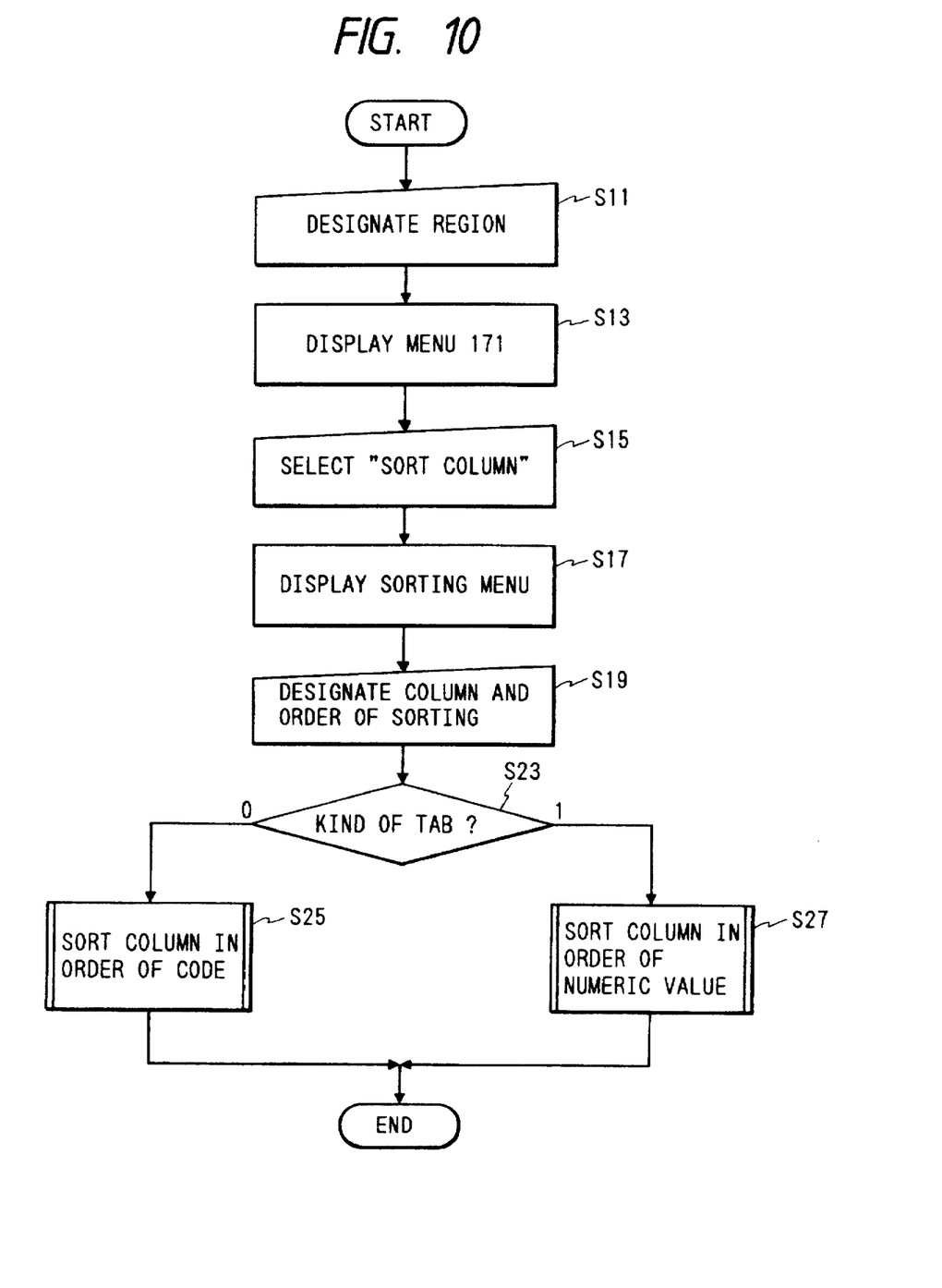
FIG. 10 is a flowchart showing an example of a sorting processing procedure according to the embodiment.
Figure 11:
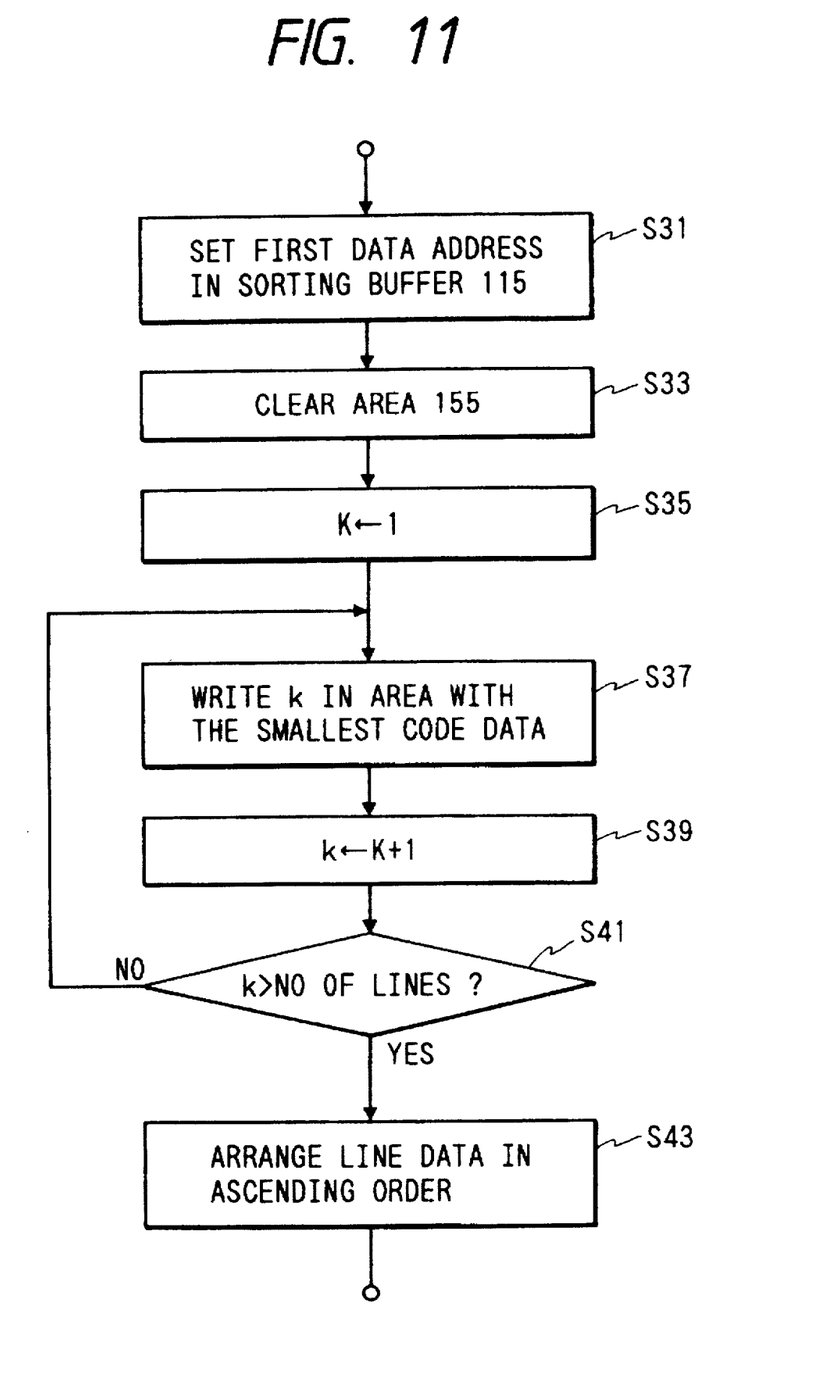
FIG. 11 is a flowchart showing an example of a sorting process which is executed in accordance with the order of codes.

FIG. 10 shows an example of a sorting processing procedure according to the embodiment. FIG. 11 is a flowchart for explaining in detail a sorting process based on the order of codes. FIGS. 12A to 12E show examples of displays upon sorting. A sorting process of the embodiment will now be described with reference to the above diagrams.

Figure 12A:
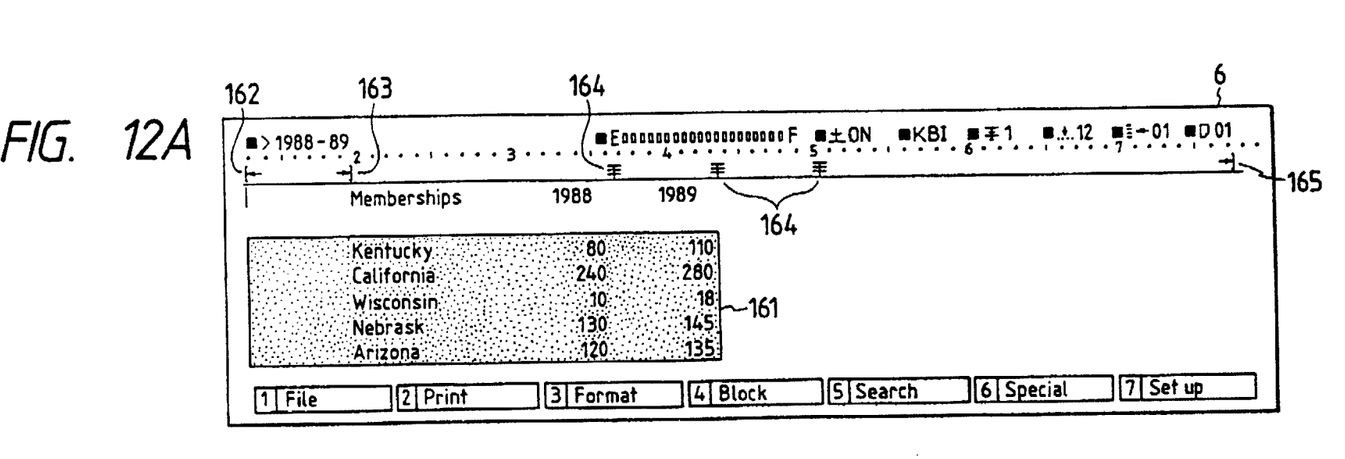
FIGS. 12A to 12E are explanatory diagrams of examples of displays upon sorting.
Figure 12B:
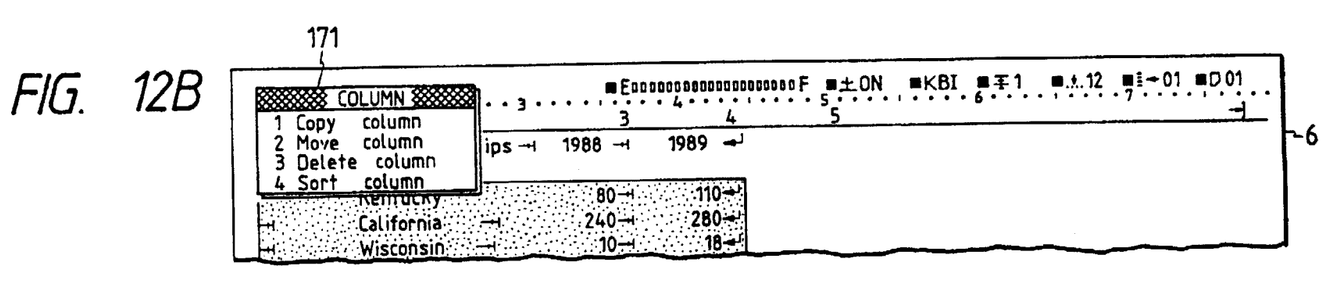
Figure 12C:
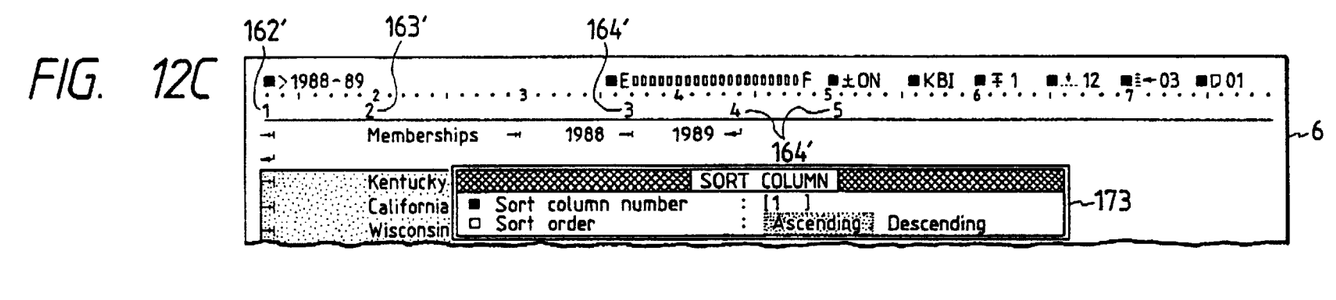
Figure 12D:
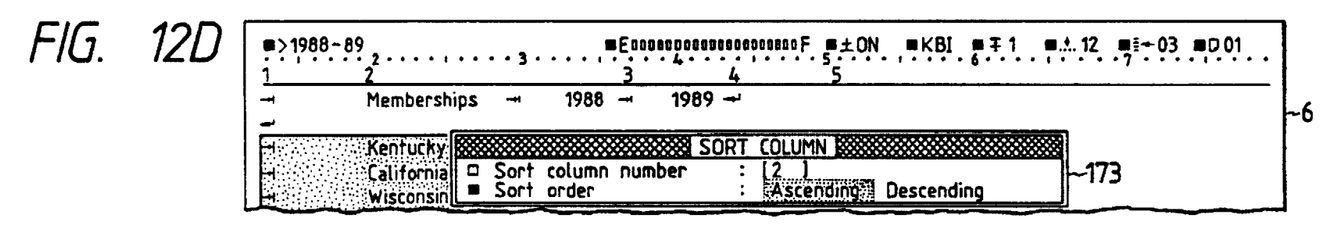

When the operator first designates a range by proper key operations with respect to a document (table) to be sorted (step S11), the range 161 is displayed on the display as an inverted image as shown in, for example, FIG. 12A. When the operator instructs a selection menu of a column process including the sorting, a menu 171 of various kinds of column processes is overlaid and displayed onto a document display screen as shown in FIG. 12B. When the sorting process in the menu is selected in step S15 (in the example shown in the diagram, "4 Sort column" is selected), sort data input screens as shown in FIGS. 12C and 12D are displayed (step S17). The column number to be sorted and the sorting order (ascending order or descending order) can be designated on the basis of the contents of the display screens (step S19). To enable the column number to be easily designated, the left margin symbol 162, the general tab position symbol 163, and the decimal tab symbol 164 in FIG. 12A have been changed to numerals (shown by reference numerals 162' to 164' in FIG. 12C) indicative of the column numbers.

A check is now made in step S23 to see if the designated column has been set by the general tab or the decimal tab. In the former case (the second column in the example of FIG. 12), step S25 follows and the sorting according to the order of codes is performed. In the latter case (the second and third columns in the example of FIG. 12), the sorting according to the order of magnitudes of numeric values is executed in step S27.

FIG. 11 shows an example of processes in the case of sorting with respect to a group of character train data in accordance with the order of codes and the ascending order (in accordance with the order of alphabets of the dictionary arrangement). In step S31, the addresses and the line numbers of the head data of the lines of the ith column (the first column in the example of FIG. 12) are developed into the sorting buffer 115 by the amounts of the number of lines. In the next step S33, the ordering area 155 in the sorting buffer 115 is cleared to 0 by an amount of the number of lines and "1" is set into a parameter k for ordering.

In step S37, at the line in which the content in the ordering area indicates "0", the code data is sequentially compared from the column head address and the value of k is written into the ordering area of the line having the smallest code data. At this time, if there is the same data as the first code data, the code data of the second and subsequent characters are also compared.

Figure 12E:
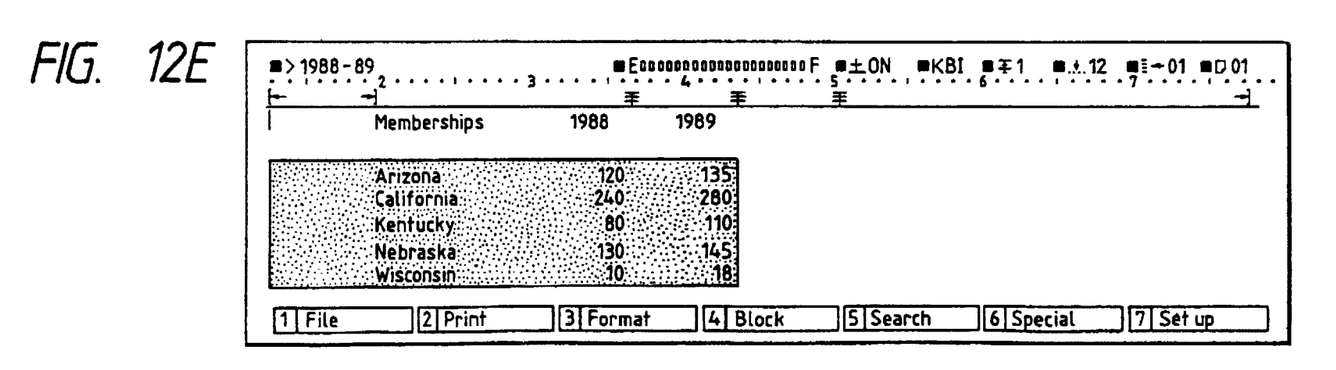

In step S39, the value of k is increased by "+1". If it is determined in step S41 that the value of k doesn't exceed the number of lines, the processing routine is returned to step S37 and the processes are continued. On the contrary, if it is decided in step S41 that the value of k has exceeded the number of lines, step S43 follows and the line data is rearranged in accordance with the ascending order with reference to the contents in the ordering area. At this time, the document as shown in FIG. 12A is sorted in accordance with the dictionary arrangement order on the basis of the contents (character data group) in the second column and is displayed as shown in FIG. 12E. The sorted document can be also printed.

Since the second column in the example of FIG. 12 is constructed by proper nouns, all of the first characters are capital letters. However, for a data group such that small letters appear as first characters, the data such that the first character is a capital letter can be allowed to be displayed first (for instance, after the data whose first characters are A to Z were arranged in accordance with the order of alphabets, the data whose first characters are a to z are arranged in accordance with the order of alphabets). Or, it is also possible to perfectly sort the data in accordance with the dictionary arranging order. The data can be also sorted in accordance with the descending order (the order of Z to A) instead of the ascending order mentioned above.

If it is determined in step S23 in FIG. 10 that the tab is the decimal tab (in the case where the third and fourth columns have been designated in the example of FIG. 12), the sorting is executed in step S27 in accordance with the order of magnitudes of numeric values. In this case, however, the processes can be also executed in accordance with a procedure similar to FIG. 12. However, in the above case, in step S37, a group of code data consisting of numerals or a numeral train are read from the address designated in step S1 and are subjected to proper processes to thereby obtain binary codes corresponding to the inherent numeric values and the comparing processes are performed on the basis of the binary codes. Upon comparing, it is suitable to convert the data into data such that each of an integer part and a decimal part has a length of five bytes and they are compared. The numeric value data can be also processed in accordance with the ascending or descending order.

The present invention is not limited to the foregoing embodiment but many modifications and variations are possible within the spirit and scope of the appended claims of the invention.

The apparatus as an object to which the invention is applied is not limited to only the electronic typewriter but the invention can be also applied to a Japanese word processor or other word processors or the like. The output device is also not limited to the ink jet printer as mentioned above.

As described above, according to the invention, the kind of tab which has been set is discriminated, and in the case of the tab to align characters, the sorting is executed on the basis of character codes. In the case of the tab to align numeric values, the numeral train are handled as numeric value data and the sorting is performed. Therefore, it is sufficient for the operator to merely designate a data group to be sorted in accordance with a predetermined rule with respect to the content of the data group. The operator can execute the sorting corresponding to the character train and numeric values at a high speed by simple operations.

What is claimed is:

1. A character processing method comprising the steps of:

setting a general tab or a decimal tab, wherein the general tab specifies a right or a left position to which a character train data group will be aligned and specifies a first sorting method and wherein the decimal tab specifies a decimal position to which a numeric value data group will be aligned and specifies a second sorting method;

aligning an input character train data group according to the alignment specified by the general tab and the specified position of the general tab in response to the setting of the general tab and aligning an input numeric value data group according to the alignment specified by the decimal tab and the specified position of the decimal tab in response to the setting of the decimal tab;

designating an aligned data group;

instructing the sorting of the designated data group;

determining whether the general tab or the decimal tab is set for aligning the designated data group;

storing, in a sorting memory, data representing the line positions of the designated data group, data representing the addresses of head characters of the designated data group when the designated data group comprises a character train data group or data representing the addresses of head numerals of the designated data group when the designated data group comprises a numeric value data group, and data representing the sort order for each head character or head numeral; and sorting the designated data group in one of the first and second sorting methods specified by one of the general and decimal tabs determined in said determining step, based on the data stored in said storing step.

2. A method according to claim 1, wherein said sorting step sorts the designated data group according to the first sorting method according to the order of character codes representing the designated data group.

3. A method according to claim 1, wherein said sorting step sorts the designated data group according to the second sorting method by converting the designated data group into binary form data representing numeric values and sorting the converted data according to the order of numeric values.

4. A character processing apparatus comprising:

setting means for setting a general tab or a decimal tab, wherein the general tab specifies a right or a left position to which a character train data group will be aligned and specifies a first sorting method and wherein the decimal tab specifies a decimal position to which a numeric value data group will be aligned and specifies a second sorting method;

input means for inputting the character train data group and the numeric value data group;

aligning means for aligning an input character train data group according to the alignment specified by the general tab and the specified position of the general tab in response to said setting means setting the general tab, and for aligning an input numeric value data group according to the alignment specified by the decimal tab and the specified position of the decimal tab in response to said setting means setting the decimal tab;

instruction means for designating a data group aligned by said aligning means and for instructing a sorting of the designated data group;

determining means for determining whether the general tab or the decimal tab is set by said setting means for aligning the designated data group;

sorting memory means for storing data representing the line positions of the designated data group designated by said instruction means, data representing the addresses of head characters of the designated data group when the designated data group comprises a character train data group or data representing the addresses of head numerals of the designated data group when the designated data group comprises a numeric value data group, and data representing the sort order for each head character or head numeral; and sorting means for sorting the designated data group in one of the first and second sorting methods specified by one of the general and decimal tabs determined by said determining means, on the basis of the data stored in said sorting memory means.

5. An apparatus according to claim 4, wherein said sorting means sorts the designated data group according to the second sorting method according to the order of character codes representing the designated data group.

6. An apparatus according to claim 4, wherein said sorting means sorts the designated data group according to the second sorting method by converting the designated data group into binary form data representing numeric values and sorting the converted data according to the order of numeric values.

* * * * *

UNITED STATES PATENT AND TRADEMARK OFFICE
CERTIFICATE OF CORRECTION

PATENT NO. : 5,721,941
DATED : February 24, 1998
INVENTOR(S) : TSUTOOMU TAKAHASHI It is certified that error appears in the above-identified patent and that said Letters Patent is hereby corrected as shown below:

<u>COLUMN 3</u>,
Line 13, "a example" should read --an example--.

<u>COLUMN 5</u>,
Line 36, ""document a" should read --a document--.

<u>COLUMN 8</u>
Line 64, "numeric values" should read --the numeric values--.

<u>COLUMN 10</u>
Line 22, "numeric" should read --the numeric--.

Signed and Sealed this

Seventeenth Day of August, 1999

Attest:

Q. TODD DICKINSON

Attesting Officer     Acting Commissioner of Patents and Trademarks